US005559195A

United States Patent [19]

McGee et al.

[11] Patent Number: 5,559,195
[45] Date of Patent: Sep. 24, 1996

[54] COATING COMPOSITION CONTAINING CARBAMATE FUNCTIONAL AND ACRYLAMIDE FUNCTIONAL COMPONENTS

[75] Inventors: John D. McGee; Brian D. Bammel, both of Highland; John W. Rehfuss, West Bloomfield, all of Mich.

[73] Assignee: BASF Corporation, Southfield, Mich.

[21] Appl. No.: 361,273

[22] Filed: Dec. 21, 1994

[51] Int. Cl.$^6$ ........................................................ G08F 8/00
[52] U.S. Cl. .................. 525/383; 525/327.3; 525/328.2; 525/379; 525/380; 525/381; 525/382; 528/44; 528/45; 528/73; 528/75; 526/301
[58] Field of Search ............................... 528/44, 75, 73, 528/45; 525/383, 328.2, 327.3, 379–382; 326/301

[56] References Cited

U.S. PATENT DOCUMENTS

| 4,301,257 | 11/1981 | Zengel et al. | 525/329 |
| 4,758,632 | 7/1988 | Parekh et al. | 525/383 |
| 5,356,669 | 10/1994 | Rehfuss et al. | 428/500 |

OTHER PUBLICATIONS

Trademark of E.I. du Pont de Nemours 'Magme 100 Multi-Functional Acrylic Monomer' 1–22 The date of publication is not available.

*Primary Examiner*—Jeffrey C. Mullis
*Assistant Examiner*—P. Hampton-Hightower
*Attorney, Agent, or Firm*—Anne Gerry Sabourin

[57] ABSTRACT

A coating composition including a first component comprising a compound having appended thereto more than one carbamate functional group, and further including a second component reactive with said carbamate groups, which is a substituted acrylamide compound. The composition is useful as a clearcoating composition in a color-plus-clear composite coating.

15 Claims, No Drawings

5,559,195

COATING COMPOSITION CONTAINING CARBAMATE FUNCTIONAL AND ACRYLAMIDE FUNCTIONAL COMPONENTS

FIELD OF THE INVENTION

The present invention relates to coating compositions for use in composite color-plus-clear coatings and method of preparation, especially the compositions for the clearcoats of such coatings.

BACKGROUND OF THE INVENTION

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberrations at the surface of the coating in order to achieve the desired visual effect such as high distinctness of image (DOI).

As such, these coatings are especially susceptible to a phenomenon known as environmental etch. Environmental etch manifests itself as spots or marks on or in the finish of the coating that often cannot be rubbed out.

Coatings containing acrylic polymers crosslinked with aminoplast and isocyanate crosslinking agents are known to provide excellent etch resistance. However, melamine derivatives used as crosslinkers are highly functionalized and tend to yield localized regions of high crosslink density within the final cured film. To provide greater coating formulation latitude, it is more desirable to have a crosslinking component that allows adjustment of the number and distribution of potential crosslinking sites along the resin from which the crosslinking film is made.

It has been found that acrylamide compounds provide less functionalized crosslinkers and allow formulation of films ranging from hard films to flexible films. Cured films resulting from coating compositions of the present invention are unexpectedly highly etch resistant.

SUMMARY OF THE INVENTION

According to the present invention, there is provided a clearcoat composition comprising:
  (a) a first component comprising a compound having appended thereto more than one carbamate functional group, and
  (b) a second component comprising a compound reactive with said carbamate groups on component (a), selected from the group consisting of substituted acrylamides.

The composite coating, when cured, provides coatings, useful for substrates such as polymeric, metallic or amorphous substrates. Flexible films formulated according to the present invention are particularly useful for polymeric substrates. The coating provides a durable, attractive clearcoat finish that is highly resistant to environmental etch and marring. The clearcoat composition can be effectively applied as a one-pack system, without the necessity of mixing reactive materials just prior to application as in a two-pack system.

DESCRIPTION OF THE PREFERRED EMBODIMENTS

The compound (a) comprises a compound selected from the group consisting of oligomers having appended thereto more than one carbamate group, having a molecular weight of between 148 and 2000, polymers having appended thereto more than one carbamate group, having a molecular weight of between 2,000 and 20,000, and a mixture of said oligomers and polymers. The preferred molecular weight for the oligomers is between 900 and 1092. The preferred molecular weight for the polymers is between 4000 and 6000. Molecular weight can be determined by the GPC method using a polystyrene standard. The carbamate content of the polymer, on a molecular weight per equivalent of carbamate functionality, will generally be between 200 and 1200, and preferably between 300 and 800.

The oligomeric compound (a), having more than one carbamate functional group has the general formula

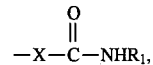

wherein X is O, S or NH, $R_1$ is H or alkyl of 1 to 4 carbon atoms. The compounds useful as oligomeric component (a) according to the invention can be prepared in a variety of ways.

The carbamate can be primary, terminating in an $NH_2$ group, or secondary terminating in an NHR group. In a preferred embodiment, the carbamate is primary. One way to prepare oligomeric compounds useful as component (a) is to react an alcohol ('alcohol' is defined herein as having one or more OH groups) with more than one urea to form a compound with carbamate groups. This reaction is accomplished by heating a mixture of the alcohol and ureas. This reaction is also performed under heat, preferably in the presence of a catalyst as is known in the art. Another technique is the reaction of an alcohol with cyanic acid to form a compound with primary carbamate groups (i.e., unsubstituted carbamates). Carbamates may also be prepared by reaction of an alcohol with phosgene and then ammonia to form a compound having primary carbamate groups, or by reaction of an alcohol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful as component (a) according to the invention. They generally have from 1 to 200 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol- 1,2-hexanediol, 2-ethyl-1,3-hexanediol, ethylpropyl- 1,5-pentanediol, 2-methyl-2,4-pentanediol, 2,2,4-trimethyl- 1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

The polymeric compound (a) is selected from the group consisting of a polyester, epoxy, alkyd, urethane, acrylic, polyamide, and polysilane polymers and mixtures thereof, wherein the polymer has more than one carbamate functional group appended thereto.

In a preferred embodiment, component (a) is a carbamate functional acrylic polymer represented by the randomly repeating units according to the following formula:

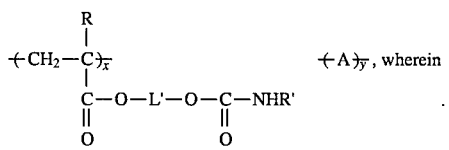

In the above formula, R represents H or CH$_3$. R' represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to photo-induced hydrolysis, and should be avoided in locations that would place the ether linkage in the crosslink matrix. The values x and y represent weight percentages, with x being 10 to 90 % and preferably 20 to 50%, and y being 90 to 10% and preferably 80 to 50%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), vinyl toluene, styrene, styrenic derivatives such as α-methyl styrene, t-butyl styrene, and the like.

L represents a divalent linking group, preferably an aliphatic of 1 to 8 carbon atoms, cycloaliphatic, or aromatic linking group of 6 to 10 carbon atoms. Examples of L include

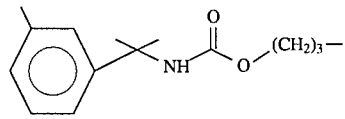

—(CH$_2$)—, —(CH$_2$)$_2$—, —(CH$_2$)$_4$—, and the like. In one preferred embodiment, —L— is represented by —COO—L'— where L' is a divalent linking group. Thus, in a preferred embodiment of the invention, the polymer component (a) is represented by randomly repeating units according to the following formula:

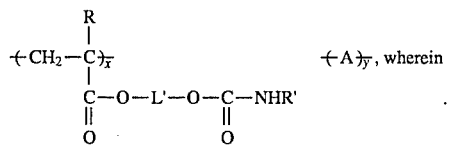

In this formula, R, R', A, x and y are as defined above. L' may be a divalent aliphatic linking group, preferably of 1 to 8 carbon atoms, e.g., —(CH$_2$)—, —(CH$_2$)$_2$—, —(CH$_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group. This carbamate functional acrylic polymer is described in U.S. Pat. No. 5,356,669 which is hereby incorporated by reference. The polymer component (a) used in the composition of the invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126, 747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting ammonia, or a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing an acrylic polymer for use as component (a) in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing such acrylic polymers involves thermally decomposing urea (to give off ammonia and HNCO) in the presence of a hydroxy-functional acrylic polymer or copolymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A more difficult, but feasible way of preparing the polymer would be to trans-esterify an acrylate polymer with a hydroxyalkyl carbamate.

The composition of the invention is cured by a reaction of the carbamate-functional component (a) with a component (b) that contains one or more functional groups that are reactive with the carbamate groups on component (a), selected from the group consisting of acrylamide functional compounds. The acrylamide functional compounds of the present invention have the formula:

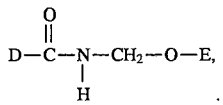

D is an aliphatic radical having a carbon chain length of between 2 and 6 carbon atoms and containing a single polymerizable double bond in the alpha-beta position with respect to the carbonyl group and the double bond is in the terminal position. Most preferably, D has the formula:

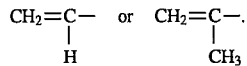

E is selected from:
hydrogen,
an alkyl radical containing from 1 to 18 carbon atoms, and

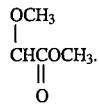

The E group is preferably selected from the group consisting of propyl, butyl and isobutyl radicals.

The acrylamide functional compounds are prepared by reacting an aldehyde, particularly formaldehyde, with an interpolymer of an unsaturated amide and at least one other monomer containing a CH2=O group.

Alternatively, the acrylamide functional compounds can be obtained by preparing an N-alkoxymethyl substituted unsaturated amide and then interpolymerizing this monomeric compound with at least one other monomer containing a CH2=C group. This method is described in U.S. Pat. No. 3,079,434, which is hereby incorporated by reference.

The preferred acrylamide functional compounds for purposes of the present invention include n-isobutoxy methyl acrylamide, n-methoxymethyl acrylamide, n-butoxymethyl acrylamide, n-isopropoxymethyl acrylamide and n-propoxymethyl acrylamide.

The equivalents ratio of carbamate functionality to acrylamide functionality in a coating composition is between 0.5:1 to 2.0:1.0 and preferably from 0.8:1 to 1.0:1.2.

In one preferred embodiment, a highly flexible film is provided by reacting a carbamate functional acrylic with isobutoxy methyl acrylamide. This film provides an excellent coating for polymeric substrates. Further, the film provides the flexibility of a softer film, while providing the etch resistance normally found only with a much harder film.

In an alternative preferred embodiment a hard film is formed from a carbamate functional oligomer formulated from hydroxyalkyl carbamate and the isocyanate group of an polyisocyanate which is combined and crosslinked with a copolymer containing isobutoxy methyl acrylamide.

The acrylamide functional compounds provide versatility in the formulation of coating compositions. The acrylamide functional compounds allow formulation of polymers from monomers having a broad range of glass transition temperatures ($T_g$). This allows formation of polymeric films ranging from flexible to rigid films. Where flexible films are desired, the acrylamide functional compounds may be used to provide less functionalized crosslinkers, that result in fewer crosslinking sites and more uniform distribution of potential crosslinking sites along the resins utilized in the coating. Where more rigid films are desired, more functional acrylamide may be used.

It has been found that clearcoat films formed from the carbamate functional components and the acrylamide functional compounds provide cured films that demonstrate both good solvent resistance and good etch resistance. Flexible films formed according to the present invention were found to exhibit significant improvement in etch performance in comparison to conventional hydroxyl/melamine systems of comparable flexibility, as shown by 14 week exterior exposure to severe weathering conditions in Jacksonville, Fla. These results are set forth in the table following the examples.

A clearcoat composition used in the practice of the present invention may optionally include solvent. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional component (a) as well as the component (b). In general, depending on the solubility characteristics of components (a) and (b), the solvent can be any organic solvent and/or water. In one preferred embodiment, the solvent is a polar organic solvent. More preferably, the solvent is a polar aliphatic solvent or polar aromatic solvents. Still more preferably, the solvent is an alcohol, a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another embodiment, the solvent is water or a mixture of water with small amounts of aqueous co-solvents.

The clearcoat composition used in the practice of the invention may include a catalyst to enhance the cure reaction. The catalyst may be used with or without blocking agents. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

In a preferred embodiment of the invention, the solvent is present in the clearcoat composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysilanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents. Curing of the basecoat may be done prior to or following clearcoat application.

The clearcoat composition is applied and subjected to conditions so as to cure the coating. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents and/or catalysts, however they generally range between 200° F. (93° C.) and 350° F. (177° C.), and are preferably between 212° F. (100° C.) and 300° F. (150° C.). The curing time will vary depending on the particular components used, and physical parameters such as the thickness of the layers, however, typical curing times range from 15 to 60 minutes.

The substrate can be any substrate onto which a coating formulation can be applied and cured. Usually the substrate is metallic or polymeric, although the substrate may be amorphous (e.g., glass). Preferably, the substrate is a metallic or polymeric panel suitable for the use as an automotive body panel.

The invention is further described in the following non-limiting examples.

EXAMPLES

Example 1

Preparation of Isobutoxymethacrylamide Functional Polymer

To a clean, dry 3 liter flask equipped with an agitator, condenser and thermocouple was added 345.0 grams isobutanol. Heat was applied and reflux maintained. In a separate vessels, 150.0 grams styrene, 200.0 grams 2-ethylhexyl acrylate, 382.0 n-butyl methacrylate, 100.0 g lauryl methacrylate and 348.9 grams N-(isobutoxymethyl)acrylamide (95%) and 95.0 grams t-butyl peroctoate were added and mixed to homogeneity. The mixture was added to the flask at a constant rate over a period of 3 hours. 133.9 grams isobutanol was added and reflux maintained for 1 hour followed by cooling.

Example 2

Preparation of Carbamate Functional Polymer

To a clean, dry 5 liter flask equipped with an agitator, condenser and thermocouple was added 417.0 grams propylene glycol methyl ether. Heat was applied and reflux maintained. In a separate vessel were added sequentially, 600.0 grams propylene glycol methyl ether, 0.34 grams 4-methoxy hydroquinone, and 730.5 grams carbamate propyl methacrylate. Mild heating and stirring was applied to the vessel such that homogeneity was reached prior to each addition until a solution was obtained. In a second vessel were added 595.8 grams 2-ethylhexyl acrylate, 384.3 grams styrene, 211.5 grams 2-ethyl hexyl methacrylate, and 319.8 grams t-butyl peroxyacetate (50%). The contents of the first and second vessels were combined and mixed until homogeneous. This mixture was added to the flask at a constant rate for a period of approximately 4 hours. A mixture of 32.1 grams t-butyl peroxyacetate (50%) and 60.0 grams aromatic 100 was added uniformly over 30 minutes. Reflux was maintained for a period of 150 minutes followed by cooling.

Example 3

Preparation of Carbamate Functional Oligomer

To a clean, dry 1 liter flask equipped with an agitator, condenser and thermocouple, the following were added under nitrogen atmosphere. 209.4 grams of a 70% solution of the isocyanurate of isophorone di-isocyanate, 86.5 grams propylene glycol methyl ether acetate, and 0.23 grams of dibutyl tin dilaurate. The mixture was warmed to approximately 70° C. after which time 77.3 grams of hydroxypropyl carbamate (95%) was added over a period of 140 minutes. Temperature was maintained at 77° C. until reaction was completed as shown by infra red spectroscopy, at which time 52.4 grams of propylene glycol methyl ether acetate and 5.0 grams n-butanol were added.

Example 4

Preparation of Clearcoat Composition

A clear coating composition was prepared by combining the following materials:

190.6 g carbamate functional acrylic (Example 2)

194.1 g isobutoxymethyl acrylamide polymer (Example 1)

103.0 g propylene glycol methyl ether acetate 3.5 g Tinuvin 123

7.5 g Tinuvin® 384B 1.25 g dodecylbenzyl sulfonic acid

The mixture was reduced to spray viscosity with 83.3 grams n-butyl acetate.

A variety of substrates were spray applied, flashed at ambient temperature for 10 minutes and baked for 30 minutes at 121° C.

Example 5

Clearcoat Coating Composition

A clearcoat was prepared by blending:

21.8 parts isobutoxy methyl acrylamide functional polymer (Example 1)

18.2 parts carbamate functional oligomer (Example 3)

0.17 parts dodecylbenzyl sulfonic acid.

This mixture was reduced with a blend of propylene glycol methyl ether acetate and ethylene glycol butyl ether. The coating was drawn down over a variety of substrates and baked 30 minutes at 121° C. The coating provided a hard MEK resistant film.

TABLE 1

Comparative Etch Results for Clearcoat Compositions

| Coating | Etch Results* |
|---|---|
| Flexible Clearcoat from (Ex. 5) | 4 |
| Flexible Clearcoat with hydroxy functional acrylic resin and methylated melamine crosslinker[1] | 75 |
| Rigid Clearcoat with hydroxy functional acrylic resin and alkoxylated melamine crosslinker[2] | 10 |
| Rigid Clearcoatt with hydroxy functional acrylic and isocyanate crosslinker[3] | 2–3 |

[1]Clearcoat with hydroxy functional e-caprolactone modified acrylic resin crosslinked with methylated melamine resin.
[2]Clearcoat with hydroxy functional acrylic resin crosslinked with alkoxylate melamine resin.
[3]Two-component clearcoat composition with hydroxy functional acrylic resin and isocyanate crosslinkers.
*Etch was measured on a scale of 1–100.
**Etch was measured after 14 week exposure to severe weather conditions in Jacksonville, Florida.

What is claimed is:

1. A coating composition comprising:
   (a) a first component comprising a compound having appended thereto more than one carbamate functional group, and
   (b) a second component comprising a compound reactive with said carbamate groups of component (a), which is a functionalized acrylamide compound having the formula:

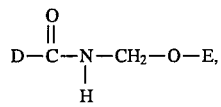

where D is an aliphatic radical having a carbon chain length of between 2 and 6 carbon atoms and containing a single polymerizable double bond in the alpha-beta position with respect to the carbonyl group, where the double bond is in the terminal position, and E is a functionality selected from the group consisting of, hydrogen, an alkyl radical containing from 1 to 18 carbon atoms, and a functional group,

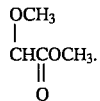

2. A composition according to claim 1 wherein component (a) comprises a compound selected from the group consisting of oligomers having appended thereto more than one carbamate functional group, said oligomers having a number average molecular weight of between 148 and 2000, polymers having appended thereto more than one carbamate functional group, said polymers having a number average molecular weight of greater than 2000, and mixtures of said polymers and oligomers.

3. A composition according to claim 2 wherein said oligomer is a primary carbamate.

4. A composition according to claim 2 wherein said polymer is selected from the group consisting of polyester, epoxy, alkyd, urethane, acrylic, polyamide and polysilane polymers and mixtures thereof.

5. A composition according to claim 2 wherein said polymer comprises a polymer backbone having appended thereto more than one carbamate functional group, said first component being represented by randomly repeating units according the formula:

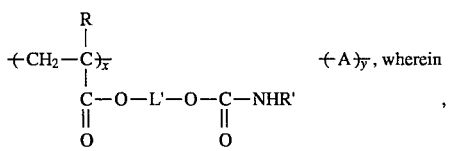

R represents H or $CH_3$,

R' represents H, alkyl, or cycloalkyl,

L represents a divalent linking group,

A represents repeat units derived from one or more ethylenically unsaturated monomers, x represents 10 to 90 weight %, and y represents 90 to 10 weight %.

6. A composition according to claim 5 comprising one or more ethylenically unsaturated monomers, more than one monomer having appended thereto a carbamate group.

7. A composition according to claim 5 wherein said ethylenically unsaturated monomers comprise one or more acrylic monomers.

8. A composition according to claim 7, wherein said acrylic monomers comprise a carbamate group.

9. A composition according to claim 5, wherein 10–90% of said ethylenically unsaturated monomers are acrylic monomers.

10. A composition wherein —L— is represented by the formula —COO—L', where L' is a divalent linking group.

11. A composition according to claim 1 wherein the D group in component (b) is:

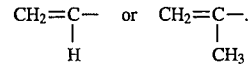

12. A composition according to claim 1 wherein the E group in component (b) is selected from the group consisting of an alkyl radical containing from 1 to 18 carbon atoms.

13. A composition according to claim 2 wherein component (a) comprises an oligomer having appended thereto more than one carbamate functional group, said oligomer having a number average molecular weight of between 148 and 2000 and component (b) has as the E group an alkyl radical containing from 1 to 18 carbon atoms.

14. A composition according to claim 2 wherein component (a) comprises a polymer having appended thereto more than one carbamate functional group, said polymer having a number average molecular weight of between 2,000 and 20,000 and component (b) has as the E group an alkyl radical containing from 1 to 18 carbon atoms.

15. A composition according to claim 1, wherein the clearcoating composition is the clear coat of a color-plus-clear composite coating.

* * * * *